(12) United States Patent
Lasson et al.

(10) Patent No.: US 12,482,874 B2
(45) Date of Patent: Nov. 25, 2025

(54) SYSTEM FOR THE THERMAL REGULATION OF A BATTERY

(71) Applicant: PLASTIC OMNIUM CLEAN ENERGY SYSTEMS RESEARCH, Lyons (FR)

(72) Inventors: Rémi Lasson, Brussels (BE); Nicolas Derangere, Brussels (BE); Cosmin Barsan, Brussels (BE)

(73) Assignee: PLASTIC OMNIUM CLEAN ENERGY SYSTEMS RESEARCH, Lyons (FR)

( * ) Notice: Subject to any disclaimer, the term of this patent is extended or adjusted under 35 U.S.C. 154(b) by 0 days.

(21) Appl. No.: 18/858,034

(22) PCT Filed: Apr. 21, 2023

(86) PCT No.: PCT/EP2023/060408
§ 371 (c)(1),
(2) Date: Oct. 18, 2024

(87) PCT Pub. No.: WO2023/203188
PCT Pub. Date: Oct. 26, 2023

(65) Prior Publication Data
US 2025/0125435 A1    Apr. 17, 2025

(30) Foreign Application Priority Data

Apr. 22, 2022 (FR) ...................................... 2203771

(51) Int. Cl.
*H01M 10/63* (2014.01)
*H01M 10/48* (2006.01)
(Continued)

(52) U.S. Cl.
CPC ......... *H01M 10/63* (2015.04); *H01M 10/486* (2013.01); *H01M 10/615* (2015.04);
(Continued)

(58) Field of Classification Search
CPC .. H01M 10/63; H01M 10/615; H01M 10/625; H01M 10/6567; H01M 10/486
See application file for complete search history.

(56) References Cited

U.S. PATENT DOCUMENTS

2013/0209838 A1   8/2013   Manna et al.
2016/0211558 A1*   7/2016   Ma ...................... H01M 10/654
(Continued)

FOREIGN PATENT DOCUMENTS

DE   10 2013 221 137 B3   10/2014
FR   3111690 A1 *   12/2021
WO   WO 2012/003209 A1   1/2012

OTHER PUBLICATIONS

FR 3111690 English Translation (Year: 2021).*
International Search Report & Written Opinion mailed on Sep. 6, 2023 in PCT/EP2023/060408 filed on Apr. 21, 2023, 11 pages.

*Primary Examiner* — Jimmy Vo
(74) *Attorney, Agent, or Firm* — Oblon, McClelland, Maier & Neustadt, L.L.P.

(57) ABSTRACT

A system for the thermal regulation of an immersion-type battery for a motor vehicle. The system includes a controller to monitor an efficiency of the thermal regulation in order to ensure the correct operation of the battery.

14 Claims, 2 Drawing Sheets

(51) Int. Cl.
*H01M 10/615* (2014.01)
*H01M 10/625* (2014.01)
*H01M 10/6567* (2014.01)

(52) U.S. Cl.
CPC ..... *H01M 10/625* (2015.04); *H01M 10/6567* (2015.04); *H01M 2220/20* (2013.01)

(56) References Cited

U.S. PATENT DOCUMENTS

| | | |
|---|---|---|
| 2020/0052356 A1 | 2/2020 | Eadelson |
| 2020/0313255 A1 | 10/2020 | Wu et al. |
| 2022/0034746 A1 | 2/2022 | Lee |

* cited by examiner

SYSTEM FOR THE THERMAL REGULATION OF A BATTERY

TECHNICAL FIELD OF THE INVENTION

The invention relates to the field of thermal regulation systems and in particular to such systems for a battery.

BACKGROUND ART

Motor vehicles increasingly need electrical energy storage capacity particularly because of the anti-pollution standards imposed by local legislation. While the use of a battery actually allows an electric motor to replace all or part of a combustion engine and the pollution associated with its combustion, it does not replace it under the same conditions of use.

A first disadvantage lies in the energy efficiency of the battery which varies significantly according to temperature and the number of cycles performed (charges and discharges already carried out). It has thus been found that outside an optimum temperature range for the battery, generally between 25° C. and 40° C., energy efficiency drops sharply and comparatively much more than with a combustion engine. In particular, exceeding the ideal temperature range can lead to thermal runaway which can result in a significant drop in energy efficiency or even at least partial irreversible damage to the electrical energy storage cells.

This disadvantage has already been raised in documents US 2020/052356, WO 2012/003209, US 2013/209838, US 2020/313255, US 2022/034746 and DE 10 2013 221137.

A second disadvantage is that, the higher the current consumption of the battery, the greater the power discharged by the battery (with the Joule effect increasing with the square of the discharge current) and the greater the incentive for the user to use a fast charging terminal (with the Joule effect increasing with the square of the charge current).

As a result, forced convection cooling or heat exchanger cooling may no longer be sufficient to limit battery temperature. Thermal regulation of the battery is therefore becoming a major challenge for motor vehicles intended to meet increasingly stringent pollution standards.

SUMMARY OF THE INVENTION

One of the aims of the invention is to propose a system for the thermal regulation of a motor vehicle battery allowing even a high-power battery to be used more safely and reliably for optimized and robust battery operation.

To this end, the object of the invention is a system for the thermal regulation of a battery for a motor vehicle comprising a closed fluid network wherein a flow of dielectric heat transfer fluid in liquid phase is formed by means of at least one pumping element, the fluid network comprising at least one battery module able to receive electrical energy storage cells intended to be thermally regulated by at least partial filling of the battery module with the dielectric heat transfer fluid, characterized in that the regulation system comprises:
 a control unit configured to monitor the effectiveness of the thermal regulation in order to guarantee correct battery operation;
 at least one temperature sensing element inside the battery module electrically connected to the control unit in order to selectively control the operating mode of the thermal regulation system based on the value measured by the temperature sensing element and a predetermined target temperature of the battery module.

Advantageously according to the invention, the regulation system is of the type involving at least partial immersion of the electrical energy storage cells of the battery in a dielectric heat transfer fluid and, preferentially, total immersion. Indeed, on the one hand, immersion is more efficient for heat exchange as the specific exchange surface area is larger and, on the other hand, evacuation from each module by circulation of the dielectric heat transfer fluid is rapid allowing high regulation efficiency and reactivity to satisfy both charging (at fast charging terminals) and discharging (electrical consumption of the vehicle at high load) of the high electrical power of the battery. In a related manner, immersion regulation is also safer against the spread of any battery fire in the motor vehicle. It is therefore understood that the thermal regulation system according to the invention allows the electrical energy storage cells to be maintained at the optimum temperature thereof so as to guarantee optimized (maintenance of the best energy efficiency) and robust (optimum charging and discharging for a longer service life) operation of the battery regardless of the external conditions wherein the motor vehicle operates, that is, even if it is very cold or very hot.

Advantageously according to the invention, the fluid network is continuously monitored in order to avoid any malfunctioning of the components of the regulation system such as a disturbance to the circulation of the dielectric heat transfer fluid, a heating and/or cooling deficit or insufficient entrainment of the dielectric heat transfer fluid flow which could render the thermal regulation of the electrical energy storage cells present in the module less effective. It is understood that the regulation system according to the invention therefore allows safer operation (maintenance of regulation quality) and greater reliability (maintenance of safe operating conditions for the regulation system-battery assembly allowing a longer service life for the assembly). It can be concluded that thermal runaway phenomena of the battery will be avoided by virtue of the thermal regulation system according to the invention which will limit the situations wherein irreversible damage to electrical energy storage cells could be caused.

Each temperature measured in each battery module is preferentially monitored continuously and as soon as one of the temperatures drifts beyond predetermined thresholds above or below the predetermined target temperature, the control unit activates cooling mode and heating mode respectively. If each of the temperature measurements remains within the range of predetermined thresholds above or below the predetermined target temperature, the control unit activates the free circulation mode which simply drives the dielectric heat transfer fluid through the fluid network without heating or cooling it. Of course, the predetermined target temperature and the predetermined thresholds may be different for each battery module depending on the configuration thereof and/or location in the motor vehicle.

According to a first aspect of the invention, the regulation system further comprises:
 a device for heating the dielectric heat transfer fluid mounted in the fluid network upstream of the pumping element;
 at least one temperature sensing element mounted on the fluid network between the downstream of the pumping element and the upstream of the battery module and electrically connected to the control unit in order to, in heating mode, selectively control the activation intensity of the heating device based on the value measured by the temperature sensing element mounted on the fluid network between the downstream of the pumping element and the upstream of the battery module;

at least one temperature sensing element mounted on the fluid network between the downstream of the battery module and the upstream of the heating device and electrically connected to the control unit in order, in heating mode, to diagnose a failure of the heating device if the value measured by the temperature sensing element between the downstream of the battery module and the upstream of the heating device is not less than the value measured by the temperature sensing element mounted between the downstream of the pumping element and the upstream of the battery module.

The control unit is preferentially configured to activate the heating device when the value measured by the temperature sensing element is less than the predetermined target temperature of the battery module in order, in heating mode, to heat up at least some of the electrical energy storage cells comprised in the battery module to the predetermined target temperature of the battery module. Herein again, depending on predetermined thresholds above or below the predetermined target temperature (which are not necessarily equal), the control unit activates or deactivates the heating mode.

It is understood that the amount of heating provided to the dielectric heat transfer fluid is not controlled by the same temperature sensing element as that used to select the operating mode of the thermal regulation system. According to the invention, this advantageously allows the intensity of the heating device to be controlled on the basis of a temperature measurement upstream of the battery module. Thus, on the one hand, this allows precise temperature control upstream of the battery module, that is, before interaction with the electrical energy storage cells, and, on the other hand, as the battery is preferably designed to comprise several modules, it provides a homogeneous inlet temperature of the dielectric heat transfer fluid in each module.

By means of simple instrumentation, the control unit of the thermal regulation system is immediately able to effectively detect whether the dielectric heat transfer fluid has actually been heated by the heating device but also, if a drop in temperature between upstream and downstream of the battery module is observed, that the electrical energy storage cells have been heated. According to the first aspect of the invention, the regulation system therefore offers a simple and highly responsive solution for detecting heating device failure allowing even high-power batteries to be used more safely and reliably for optimized and robust battery operation.

According to a second aspect of the invention, the regulation system further comprises:

a device for cooling the dielectric heat transfer fluid mounted in the fluid network upstream of the pumping element;

at least one temperature sensing element mounted on the fluid network between the downstream of the pumping element and the upstream of the battery module and electrically connected to the control unit (which may be the same as that used for heating mode) in order to, in cooling mode, selectively control the activation intensity of the cooling device based on the value measured by the temperature sensing element mounted on the fluid network between the downstream of the pumping element and the upstream of the battery module;

at least one temperature sensing element mounted on the fluid network between the downstream of the battery module and the upstream of the cooling device (which may be the same as that used for heating mode) and electrically connected to the control unit in order to, in cooling mode, diagnose a failure of the cooling device if the value measured by the temperature sensing element between the downstream of the battery module and the upstream of the cooling device is not greater than the value measured by the temperature sensing element mounted between the downstream of the pumping element and the upstream of the battery module.

The control unit is preferentially configured to activate the cooling device when the value measured by the temperature sensing element is greater than the predetermined target temperature of the battery module in order, in cooling mode, to cool at least some of the electrical energy storage cells comprised in the battery module to the predetermined target temperature of the battery module. Herein again, depending on predetermined thresholds above or below the predetermined target temperature (which are not necessarily equal, nor necessarily identical to those of the heating mode), the control unit activates or deactivates the cooling mode.

It is therefore understood that the amount of cooling provided to the dielectric heat transfer fluid is not controlled by the same temperature sensing element as that used to select the operating mode of the thermal regulation system. According to the invention, this advantageously allows the intensity of the cooling device to be controlled on the basis of a temperature measurement upstream of the battery module. Thus, on the one hand, this allows precise temperature control upstream of the battery module, that is, before interaction with the electrical energy storage cells, and, on the other hand, as the battery is preferably designed to comprise several modules, it provides a homogeneous inlet temperature of the dielectric heat transfer fluid in each module.

By means of simple instrumentation, the control unit of the thermal regulation system is immediately able to effectively detect whether the dielectric heat transfer fluid has actually been cooled by the cooling device but also, if an increase in temperature between the upstream and downstream of the battery module is observed, that the electrical energy storage cells have been cooled. According to the second aspect of the invention, the regulation system therefore offers a simple and highly responsive solution for detecting cooling device failure allowing even high-power batteries to be used more safely and reliably for optimized and robust battery operation.

Since the regulation system comprises both a cooling device and a heating device, it is immediately clear that the control unit and the temperature sensing elements can be shared to manage both heating mode and cooling modes without increasing the complexity of the instrumentation.

The invention may also comprise one or more of the following optional features, taken alone or in combination.

The fluid network preferentially comprises several battery modules mounted in parallel which offers several advantages. Firstly, it is easier to regulate several battery modules in parallel than a single volume comprising the same number of electrical energy storage cells. It is also easier to install several battery modules in parallel in a motor vehicle than a single volume comprising the same number of electrical energy storage cells. Finally, it is easier to be able to replace one module comprising defective electrical energy storage cells than to replace the whole battery for only a small proportion of defective electrical energy storage cells. The control unit is preferentially configured to diagnose an obstruction of a battery module when the value variations of each temperature sensing element inside each battery module are different. In fact, as the battery modules are in parallel and supplied by the same dielectric heat transfer fluid at the same temperature, a variation in the temperature of one module beyond a predetermined threshold above the average temperature of the other battery modules can lead to the conclusion that a circulation fault is present in the module where the temperature variation changes more markedly than in the others. It is thus understood that diagnosis of the control unit will make it possible to quickly check any defective electrical energy storage cells and where obstructions are by already knowing which battery module to check.

The control unit is preferentially configured to vary the flow rate of the pumping element based on the electrical charging or discharging power of the battery in order to adapt the circulation flow of the dielectric heat transfer fluid in the fluid network based on the operation of the battery. It is therefore understood that the higher the battery charging or discharging power, the higher the flow rate of the pumping element, so the volume per unit time of dielectric heat transfer fluid passing through each module is higher to increase the thermal regulation capacity of the system. According to one example, the variation in flow rate of the pumping element could be proportional to the charging or discharging power of the battery.

The thermal regulation system may comprise at least one flow sensing element downstream of the battery module electrically connected to the control unit in order to selectively control the pumping element based on the value measured by the flow sensing element. In fact, it may be useful to measure the effective flow rate after the pressure losses experienced in each battery module, in order to, optionally, correct the pumping element control to obtain the thermal regulation power actually required depending on the volume per unit time of dielectric heat transfer fluid passing through each module.

The thermal regulation system comprises at least one pressure sensing element between the downstream of the pumping element and the upstream of the battery module and electrically connected to the control unit in order to diagnose, by comparing the value measured by the pressure sensing element with the pressure estimated from the operating conditions of the pumping element, a leak or, on the contrary, an obstruction in the fluid network. Herein again, if the fluid network has no faults, this diagnosis would not be necessary. However, in the case of an on-board thermal regulation system in a motor vehicle, it may be useful to measure the effective pressure between the pumping element and each battery module in order to determine, if the pressure is higher than a predetermined threshold than that theoretical for the current operation of the pumping element, that the circulation of the dielectric heat transfer fluid is impeded in the fluid network or, on the contrary, to determine, if the pressure is lower than a certain predetermined threshold than that theoretical of the current operation of the pumping element, that part of the dielectric heat transfer fluid is escaping from the fluid network. It is thus understood that diagnosis of the control unit will allow the fluid network to be quickly checked before electrical energy storage cells become defective due to poor thermal regulation.

The invention also relates to a motor vehicle characterized in that it comprises a thermal regulation system as presented above, each battery module of which comprises electrical energy storage cells. Advantageously according to the invention, all the technical features and effects of the thermal regulation system guarantee optimum operation of the electrical energy exchanges between the battery and the motor vehicle components such as, for example, when the motor vehicle is in motion or when recharging with electrical energy while the motor vehicle is parked.

BRIEF DESCRIPTION OF THE FIGURES

Other features and advantages of the invention will become apparent from the description given below, by way of indication and in no way limiting, with reference to the accompanying drawings, wherein.

DETAILED DESCRIPTION

Figure 1:
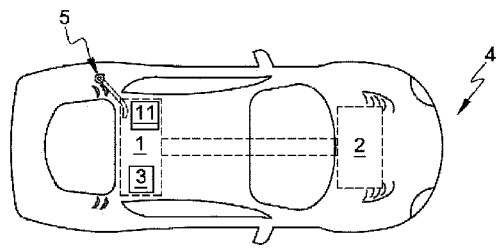
FIG. 1 is a schematic top view of an example vehicle wherein a thermal regulation system according to the invention is mounted.

In the following, the orientations are the orientations of the figures. In particular, the terms "upper", "lower", "left", "right", "above", "below", "forward" and "backward" are generally understood relative to the direction of representation of the figures. Furthermore, the terms "upstream" and "downstream" refer to the direction of flow of the dielectric heat transfer fluid in the fluid network of the thermal regulation system.

In the present description, to clarify the explanation of the invention, elements for sensing temperature (T01, T02, etc.), presence (C02), flow (F03), quality (Q04), pressure (P01) or level (L04) are arbitrarily declared as a first sensing element, a second sensing element, and so on. This is a simple nomenclature for differentiating and naming the various elements of the thermal regulation system 1. This nomenclature does not mean that one sensing element has priority relative to another and such designations can easily be changed without departing from the scope of the present description. Nor does this nomenclature imply an order, that is, a third sensing element could be used without the need for a first sensing element and/or a second sensing element to implement the invention.

The invention applies to any type of thermal regulation system 1 by battery immersion, in particular those designed to equip a motor vehicle 4 such as a car, SUV ("Sport Utility Vehicles"), two-wheeler (especially motorcycles), aircraft, industrial vehicles chosen from vans, "heavy goods vehicles"—that is, subways, buses, road transport vehicles (trucks, tractors, trailers), off-road vehicles such as agricultural or civil engineering machinery-, or other transport or handling vehicles.

The motor vehicle 4 may be of the electric type, that is with at least one electric motor powered by at least one battery, of the hybrid type, that is with at least one internal combustion engine powered by at least one fuel (gasoline, liquefied petroleum gas, diesel, natural gas for vehicles, bio-fuel such as ethanol obtained from plant matter, etc.) and assisted by at least one electric motor powered by at least one battery and/or by the on-board network of the motor vehicle 4, of the fuel cell type, that is with at least one electric motor powered by at least one battery and/or by a fuel cell powered by dihydrogen and dioxygen, or else of the rechargeable hybrid type, that is with at least one internal combustion engine powered by at least one fuel (petrol, liquefied petroleum gas, diesel, natural gas for vehicles, bio-fuel such as for example ethanol obtained from plant matter, etc.) and at least one electric motor powered by the on-board network of the motor vehicle 4 and/or at least one battery rechargeable by connection to an electrical network external to the motor vehicle 4. Of course, the invention is not limited to the above examples of motor vehicles 4 but can be applied to any type of motor vehicle 4 comprising at least one battery without departing from the scope of the invention.

"Thermal regulation system 1" is understood to mean all types of system 1 for controlling the flow, temperature and pressure of a dielectric heat transfer fluid designed, by moving said dielectric heat transfer fluid around some of the electrical energy storage cells 9 of a battery 3 (exchange by immersion in the dielectric heat transfer fluid), to thermally exchange with said some of the electrical energy storage cells 9 in order to control the temperature thereof, that is, typically to heat and/or cool, according to a predetermined control, said some of the electrical energy storage cells 9 immersed in the dielectric heat transfer fluid.

"Dielectric heat transfer fluid" is understood to mean a fluid intended to remain in liquid form in the fluid network 6 of the thermal regulation system 1 in order to exchange, by contact, the cold and/or heat of at least some of the electrical energy storage cells 9 of a battery 3. Typically, the dielectric heat transfer fluid can circulate around all or some of the electrical energy storage cells 9 by at least partially filling a battery 3 module 7. As explained above, the dielectric heat transfer fluid is single-phase, that is it will not change phase (remain liquid) within the temperature range considered in normal operation such as, for example, between −40° C. and 60° C. According to the invention, the heat transfer fluid is dielectric, that is preferentially has an electrical resistivity $\rho$ at least equal to $1 \cdot 10^9$ ohm meters (1 GΩ·m) at a temperature of 300 kelvins (300 K) or, conversely, an electrical conductivity $\sigma$ at most equal to $1 \cdot 10^{-9}$ siemens per meter (1 nS·m$^{-1}$) at a temperature of 300 kelvins (300 K), in order not to disturb the electrical connections notably between the cells 9 present in a same battery 3 module 7. This type of dielectric heat transfer fluid may be similar to those used for electrical transformers. It will therefore not be described further in the present description as it is known per se. By way of non-limiting example, the dielectric heat transfer fluid may for example be a Novec® 7500 type product sold by 3M®, a F18 or F20 type product sold by Total® or a DF7 or DFK type product sold by MiVolt®.

"Electrical energy storage cell 9" is understood to mean all types of electrochemical accumulators capable of storing electrical energy and, in a reversible manner, releasing the stored electrical energy.

"Battery 3 module 7" is understood to mean a housing designed to group together at least two electrical energy storage cells 9 electrically connected in series or in parallel. In the context of the invention, a dielectric heat transfer fluid is circulated in at least one battery 3 module 7 in order to thermally regulate at least some of the electrical energy storage cells 9 that can be accommodated in the battery 3 module 7.

"Battery 3" is understood to mean all the modules 7 electrically connected in series or parallel and, incidentally, all the electrical energy storage cells 9 included in the modules 7.

"Powertrain 2" is understood to mean the assembly comprising the engine(s) designed to directly or indirectly drive the wheels of the motor vehicle 4 as well as the accessories of each engine such as, for example, the alternator, the cooling system, the gearbox or the lubrication system.

In the example shown in FIG. 1, a system 1 for the thermal regulation of a battery 3 is mounted in a motor vehicle 4. In this example, an electrical connection element 5 is provided on the bodywork of the motor vehicle 4 to allow recharging of the battery 3. As explained above, the thermal regulation system 1 and/or the battery 3 may be fluidically and/or electrically connected to the powertrain 2. Advantageously according to the invention, all the technical features and effects of the thermal regulation system 1 guarantee optimum operation of the electrical energy exchanges between the battery 3 and the components of the motor vehicle 4 such as, for example, when the motor vehicle is in motion or when recharging with electrical energy while the motor vehicle is parked.

Advantageously, according to the invention, the thermal regulation system 1 is of the immersion type of electrical energy storage cells 9, that is each battery 3 module 7 comprises a housing 8 designed to enclose electrical energy storage cells 9 in dielectric heat transfer fluid. Preferentially, the electrical energy storage cells 9 of each battery 3 module 7 are fully immersed in dielectric heat transfer fluid.

On the one hand, immersion is more efficient for heat exchange as the specific exchange surface area is larger and, on the other hand, evacuation from each battery 3 module 7 by circulation of the dielectric heat transfer fluid is rapid allowing high regulation efficiency and reactivity to satisfy both charging (at fast charging terminals) and discharging (electrical consumption of the motor vehicle 4 at high load) of the high electrical power of the battery. Additionally, heat exchange is highly efficient as it takes place directly by convection of the heat transfer fluid on the casing of each electrical energy storage cell 9. In a related manner, immersion control is also safer against the spread of any battery 3 fire in the motor vehicle 4. It is therefore understood that the thermal regulation system 1 according to the invention allows the electrical energy storage cells 9 to be maintained at the optimum temperature thereof, so as to guarantee optimized (maintenance of the best energy efficiency) and robust (optimum charging and discharging for a longer service life) operation of the battery 3 regardless of the external conditions wherein the motor vehicle 4 operates, that is, even if it is very cold or very hot.

The thermal regulation system 1 thus comprises a closed fluid network 6 wherein a flow of dielectric heat transfer fluid in liquid phase is formed by means of at least one pumping element PUMP01. In the example shown in FIGS. 2 to 4, the fluid network 6 therefore notably comprises all the modules 7 of the battery 3 (three in FIG. 3) so that the electrical energy storage cells 9 can be thermally regulated by the circulation of dielectric heat transfer fluid in each housing 8. The fluid network 6 thus comprises a pipe structure on which a set of instruments is mounted allowing the control unit 11 of the thermal regulation system 1 to manage the circulation of the dielectric heat transfer fluid.

The fluid network 6 preferentially comprises several battery 3 modules 7 connected in parallel which offers several advantages. Firstly, it is simpler to regulate several battery 3 modules 7 in parallel than a single volume with the same number of electrical energy storage cells 9. It is also simpler to install several battery 3 modules 7 in parallel in a motor vehicle 4 than a single volume comprising the same number of electrical energy storage cells 9. Finally, it is simpler to be able to change a module 7 comprising defective electrical energy storage cells 9 than to change the entire battery 3 for only a small portion of defective electrical energy storage cells 9.

The pumping element PUMP01 allows the dielectric heat transfer fluid to be pressurized and thus circulated through the fluid network 6. The pumping element PUMP01 must therefore ensure a given flow rate and overcome the pressure losses present in the fluid network 6. As will be explained in greater detail above, it is directly controlled by the control unit 11 (sometimes referred to as the "battery thermal management system" or "BTMS") based on the measurements taken by the set of instruments in the fluid network 6.

Figure 2:
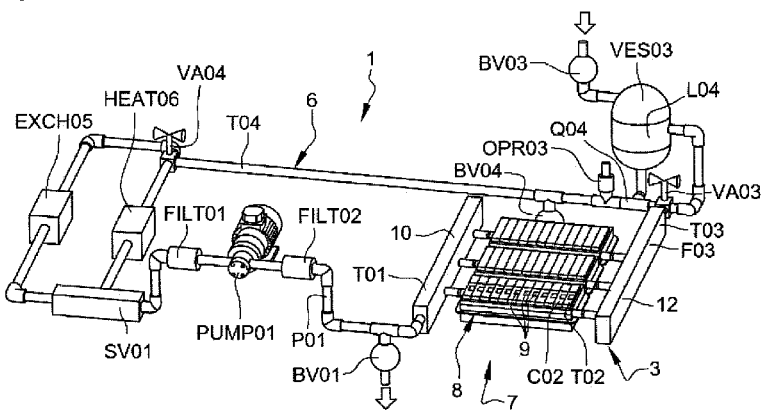
FIG. 2 is a schematic perspective view of an example thermal regulation system according to the invention.
Figure 3:
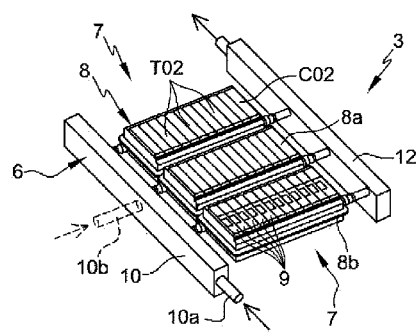
FIG. 3 is an enlarged partial view of FIG. 2 centered on the battery.
Figure 4:
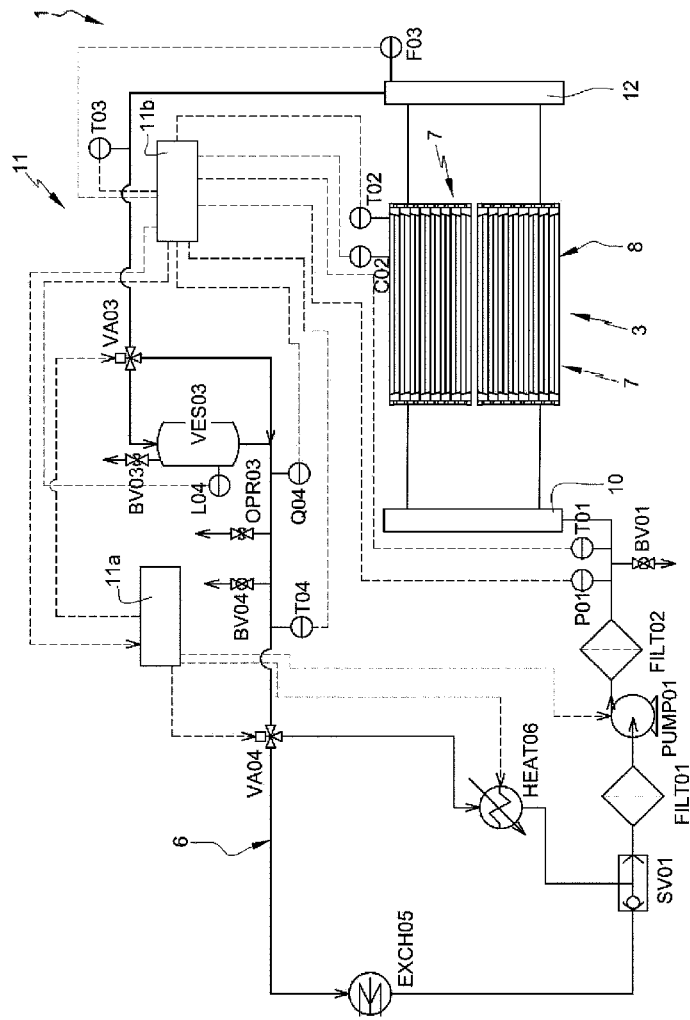
FIG. 4 is a schematic view of the electrical and fluid connections of an example thermal regulation system according to the invention.

In the example shown in FIGS. 2 to 4, filter elements FILT01 and FILT02 can be seen on either side of the pumping element PUMP01. Filter elements FILT01, FILT02 protect the components of the thermal regulation system 1 from external contamination. Filter element FILT01 protects the pumping element PUMP01 from particles generated by filling the fluid network 6 with dielectric heat transfer fluid or generated by the electrical energy storage cells 9 (in the event of thermal runaway, for example). Filter element FILT02 protects the electrical energy storage cells 9 for example by blocking particles that may be generated by the pumping element PUMP01 during the running-in phase thereof.

Preferentially controllable valves BV01, BV03 are used to purge the fluid network 6, with a view to replacing the dielectric heat transfer fluid or changing a component of the thermal regulation system 1. To do this, valve BV03 must first be opened to vent the fluid network 6. Valve BV01 must then be opened to allow the dielectric heat transfer fluid to flow out of the fluid network 6. Preferentially, as shown in the example in FIG. 2, valve BV03 is located above, that is, at a higher altitude relative to ground level, than most of the fluid network 6 and, conversely, valve BV01 is located below, that is, at a lower altitude relative to ground level, than most of the fluid network 6, thus facilitating the evacuation of the dielectric heat transfer fluid with the aid of gravity. The fluid network 6 can then be refilled via valve BV03 (having first closed valve BV01). It can be seen that valve BV03 communicates with the fluid network 6 via the expansion vessel VES03 making it easy to fill and regulate the volume of dielectric heat transfer fluid in the fluid network 6.

Additionally, valve BV04 can be used to purge the system in the event of incorrect filling. In fact, as will be explained more fully below, when there is a fluid filling error, the fluid is contained between controllable proportional valves VA03 and VA04. Valve BV04 therefore allows this portion of the fluid network 6 to be emptied of any mistakenly inserted fluid.

Expansion vessel VES03 is located downstream of valve VA03, so that the latter can function. The primary function of expansion vessel VES03 is to compensate for thermal expansion of the dielectric heat transfer fluid, or any other volume variation that may occur in the fluid network 6. As the dielectric heat transfer fluid is considered incompressible, the fluid network 6 is protected against the pressures and negative pressures of the dielectric heat transfer fluid which can damage components or impair their functionality. If the volume of the dielectric heat transfer fluid changes, an inert gas in expansion vessel VES03 expands or compresses to match the changes in the dielectric heat transfer fluid. This gas will therefore rise or fall in pressure. This also means that in the event of a reduction in the volume of fluid in the circuit, the expansion vessel VES03 will also act as a reserve of dielectric heat transfer fluid to supply the fluid network 6 and attenuate this reduction in volume.

Expansion vessel VES03 also helps cool the dielectric heat transfer fluid in the fluid network 6. As the fluid network 6 passes through expansion vessel VES03, the thermal inertia of the cold dielectric heat transfer fluid located in expansion vessel VES03 allows it to absorb some of the heat from the hot dielectric heat transfer fluid coming from the battery 3 modules 7. This natural cooling thus reduces the energy consumption of the cooling device EXCH05 needed to correctly regulate the temperature of the dielectric heat transfer fluid.

Additionally, expansion vessel VES03 comprises an internal level sensing element L04. It allows the control unit 11 to be warned when the level of dielectric heat transfer fluid in expansion vessel VES03 is too low, which could notably mean a leak for example. This may be an all-or-nothing sensor sending a signal only when the level becomes critical, or a sensor sending back the liquid level in real time using for example a float moved by the level of dielectric heat transfer fluid in the expansion vessel VES03.

The pressure relief valve OPR03 is a valve that opens at high pressure. It protects the system from pressure increases too great to be compensated for by expansion vessel VES03, in particular overpressures induced by gas release from an electrical energy storage cell 9 in the event of thermal runaway. This thus prevents the system from exploding under the increased pressure. The pressure relief valve OPR03 will therefore open when the pressure is too high, release the gas into the atmosphere to reduce the internal pressure of the fluid network 6, and close again when the pressure returns to an acceptable level. The gas must be expelled far enough away from users to avoid endangering them. The pressure threshold at which pressure relief valve OPR03 is triggered is preferentially dependent on the operating pressure of the fluid network 6, that is, it must not be triggered at a pressure too close to the operating pressure. The pressure threshold may, for example, be between 3.0 bar and 3.5 bar if the operating pressure of the fluid network 6 is 2 bar, that is, equal to 3.0 bar, 3.1 bar, 3.2 bar, 3.3 bar, 3.4 bar or 3.5 bar. The pressure threshold for closing pressure relief valve OPR03 may be, for example, between 2.5 bar and 3.0 bar, that is for example equal to 2.5 bar, 2.6 bar, 2.7 bar, 2.8 bar, 2.9 bar or 3.0 bar. Preferentially, the difference between the values of the pressure thresholds between opening and closing the pressure relief valve OPR03 may be, for example, between 0.5 bar and 1 bar, that is, equal to 0.5 bar, 0.6 bar, 0.7 bar, 0.8 bar, 0.9 bar or 1.0 bar. Of course, these values may vary depending on the operating pressure of the fluid network 6.

The valve VA03, preferentially the controllable proportional type, is positioned between the battery 3 modules 7 and the expansion vessel VES03. It is also preferably located upstream of valve BV03. Valve VA03 is controlled by the control unit 11 based on the selected mode of the thermal regulation system 1 as explained below. Valve VA03 allows a partial bypass of the expansion vessel VES03. This bypass must be partial in order not to lose the functionality of the expansion vessel VES03, namely to compensate for thermal expansion of the dielectric heat transfer fluid (this protects the thermal regulation system 1 from dielectric heat transfer fluid pressures and negative pressures that could damage the components thereof or impair their functionality). The partial bypass is designed to limit, in heating mode, the quantity of "hot" dielectric heat transfer fluid passing through the expansion vessel VES03 in order to limit cooling of the dielectric heat transfer fluid by exchanging heat with the fluid present in the expansion vessel VES03. The bypass ratio, in heating mode, of valve VA03 may be, for example, between 10% and 80% to expansion vessel VES03, that is, for example equal to 10%, 20%, 30%, 40%, 50%, 60%, 70%, or 80%, and the remainder to valve VA04. Preferably, the bypass ratio is managed by the control unit 11 based on the temperature difference between the fluid inside expansion vessel VES03 (using a temperature sensor mounted in expansion vessel VES03) and the temperature measured by the third temperature sensing element T03 upstream of expansion vessel VES03. More specifically, the greater the temperature difference, the more preferentially the bypass ratio to the expansion vessel VES03 is reduced.

The normal position of valve VA03 is normally fully open towards the expansion vessel VES03. Thus, if the thermal regulation system 1 is switched off, the dielectric heat transfer fluid is automatically directed to the expansion vessel VES03, thereby taking advantage of the thermal inertia provided by the vessel to cool the dielectric heat transfer fluid. This makes the system safer in the event of thermal runaway of an electrical energy storage cell 9 by ensuring that no hot dielectric heat transfer fluid is supplied to the electrical energy storage cells 9, which would increase the thermal runaway phenomenon.

Valve VA04, preferably the controllable proportional type, is preferably located between expansion vessel VES03 and cooling device EXCH05 and heating device HEAT06. More specifically, valve VA04 can be used to selectively direct the dielectric heat transfer fluid to either cooling device EXCH05 or heating device HEAT06. In the example shown in FIGS. 2 and 4, cooling device EXCH05 and heating device HEAT06 are mounted in parallel from valve VA04. This is an on/off valve that can also be closed. It is therefore understood that the dielectric heat transfer fluid may be directed entirely to either the cooling device EXCH05 or the heating device HEAT06 or it can be prevented from passing the valve VA04. The position of valve VA04 depends on the strategy adopted by the control unit 11 (heating mode, free circulation mode, cooling mode), as will be explained below. The normal position of valve VA04 is fully open towards the cooling device EXCH05. Thus, if the thermal regulation system 1 is switched off, the dielectric heat transfer fluid is automatically directed in its entirety to the cooling device EXCH05. This makes the thermal regulation system 1 safer in the event of thermal runaway of an electrical energy storage cell 9 by ensuring that no hot dielectric heat transfer fluid is supplied to the electrical energy storage cells 9, which would accentuate the thermal runaway phenomenon.

In the example shown in FIGS. 2 and 4, the parts of the parallel fluid network 6 comprising cooling device EXCH05 and heating device HEAT06 from valve VA04 are joined by a shuttle valve SV01 upstream of the pumping element PUMP01. The latter is preferably a mechanical valve that opens under fluid pressure. The purpose of this valve, when one of the free circulation or heating modes is activated, is to prevent the pumping element PUMP01 from drawing in the dielectric heat transfer fluid located in the cooling circuit, which would result in the temperature of the dielectric heat transfer fluid not changing to the desired value.

The cooling device EXCH05 preferentially consists of a cooling element and a heat exchanger with the dielectric heat transfer fluid to selectively cool the dielectric heat transfer fluid to a setpoint temperature controlled by the control unit 11 before it reaches the shuttle valve SV01. The cooling element may advantageously be the cold circuit of a cooling system of the powertrain 2 of the motor vehicle 4 or a dedicated chiller.

Heating device HEAT06 is located in parallel with cooling device EXCH05. It preferentially comprises a heating element and a heat exchanger with the dielectric heat transfer fluid to selectively heat the dielectric heat transfer fluid to a setpoint temperature controlled by the control unit 11 before it reaches the shuttle valve SV01. The heating element may advantageously be the hot circuit of a cooling system of the powertrain 2 of the motor vehicle 4 or a dedicated heater. The heating element is preferentially only activated in heating mode, and is switched off when the other modes are selected.

The battery 3 modules 7 form the heart of the thermal regulation system 1 and form part of the fluid network 6. They are designed to contain the electrical energy storage cells 9 which need to be thermally regulated. Preferentially, several battery 3 modules 7 are fluidically connected to the rest of the fluid network 6 via hydraulic connections to a common inlet manifold 10 and a common output manifold 12. In the example shown in FIGS. 2 to 4, the battery 3 modules 7 (three in FIGS. 2 and 3) are placed in parallel in the fluid network 6 to allow an equitable and homogeneous supply of dielectric heat transfer fluid for each of the battery 3 modules 7 thus guaranteeing homogeneous thermal regulation of the electrical energy storage cells 9. This parallel arrangement also reduces pressure losses in the fluid network 6. In order to homogenize the pressure losses in each of the connections of the battery 3 modules 7 (and therefore to have similar flow rates in each module), the fluid connection section between the common inlet manifold 10 and the associated battery 3 module 7 thereof is of a different size depending on its distance from its connection to the fluid network 6 in order to obtain an equivalent dielectric heat transfer fluid flow rate between the battery 3 modules 7. Typically, in the case of a side connection 10a of the common inlet manifold 10, the cross-section of each connection will increase as the connection moves further away from the side connection 10a. Another type of connection is also possible. By way of non-limiting example, a frontal connection 10b (but also above or below) is also possible. In a similar way, the cross-section of the connections will be adapted to obtain an equivalent flow of dielectric heat transfer fluid between the battery 3 modules 7.

Manifolds 10, 12 are also used to position and hold battery 3 modules 7 in position so that forces do not pass through the fluid connections. The battery 3 modules 7 also allow the electrical connection of the electrical energy storage cells 9 to the rest of the motor vehicle 4 to guarantee the electrical energy supply thereof. These electrical connections are achieved by waterproof connectors. The battery 3 modules 7 each comprise a housing 8 consisting of a lower recessed base 8b (accommodating the electrical energy storage cells 9) sealed by an upper cover 8a to provide protection for the electrical energy storage cells 9 against mechanical incidents (crashes, mechanical shocks, etc.) as well as protection in the event of fire (limits the progress of flames external to each battery 3 module 7 so that they do not reach the electrical energy storage cells 9).

In the example shown in FIGS. 2 and 4, the set of instruments of the fluid network 6 comprises elements for sensing temperature T01, T02, T03, T04, pollution C02, flow F03, quality Q04 and pressure P01 (in addition to the level sensing element L04 of the expansion vessel VES03) allowing the control unit 11 of the thermal regulation system 1 to manage the circulation of the dielectric heat transfer fluid. The control unit 11 thus comprises a processing module 11*a*, that is, programmable intelligence, based on the measurements received by the receiving module 11*b* of the set of instruments of the fluid network 6 in order to manage the thermal regulation system 1 based on the measurements of the set of instruments of the fluid network 6. Of course, the set of instruments could comprise more or fewer sensing elements depending on the applications and/or the desired complexity of the thermal regulation system 1

The pressure sensing element P01 measures the pressure of the dielectric heat transfer fluid in the fluid network 6 at the outlet of the pumping element PUMP01. In order to avoid any pressure losses that could distort the pressure measurement, it is preferentially located as close as possible downstream of the pumping element PUMP01. The value measured by the pressure sensing element P01 is transmitted to the control unit 11 which analyzes it and makes it possible to manage a possible correction of the pumping element PUMP01 control (rotation speed, flow rate, etc.) and/or to diagnose problems in the fluid network 6 (leaks or obstructions (at least partial clogging) of the fluid network 6).

Each battery 3 module 7 comprises preferentially at least one pollution sensing element C02 in close proximity to the electrical energy storage cells 9 in order to detect deterioration of at least one of the electrical energy storage cells 9 thereof. More specifically, each pollution sensing element C02 is designed to detect whether at least one gas is escaping from the electrical energy storage cells 9 when at least one thereof is subjected to thermal runaway. In fact, an exhaust valve is usually provided, often formed by a frangible part designed to break at a predetermined internal pressure, to let the excess pressure escape outside the electrical energy storage cell 9. Once the exhaust valve is opened, the electrical energy storage cell 9 is therefore no longer functional. Each pollution sensing element C02 may therefore be a composition, pressure, transparency or conductivity sensor to determine whether a gas has escaped from at least one of the electrical energy storage cells 9 of the battery module 7 in order to diagnose thermal runaway. Thus, when the presence of such pollution gases is detected in a battery 3 module 7, the control unit 11 can impose the shutdown of the thermal regulation system 1 and send an alert identifying each defective module 7 before an electrical energy storage cell 9 catches fire. Once the defective module has been identified, it can then be replaced without affecting the other modules.

The flow sensing element F03 is preferentially mounted at the end of the common output manifold 12 as close as possible upstream of the valve VA03. By placing it after the battery 3 modules 7, it is possible to know the overall flow rate through all the battery 3 modules 7, even in the event of a leak between the flow sensing element F03 and the pumping element PUMP01. The flow sensing element F03 may consist of a flow meter. The flow sensing element F03 allows the control unit 11 to manage a possible correction of the pumping element PUMP01 control (rotation speed, flow rate, etc.) in order to supply the electrical energy storage cells 9 with the flow rate required to cool them and/or to estimate the possible thermal regulation power.

In the example shown in FIGS. 2 to 4, several temperature sensing elements T01, T02, T03, T04 are provided to monitor the temperature of the dielectric heat transfer fluid at several predetermined locations in the fluid network 6. Each temperature sensing element T01, T02, T03, T04 may comprise at least one temperature sensor for example of the thermocouple type or another type.

A first temperature sensing element T01 may be used to measure the fluid temperature upstream of the battery 3 modules 7 and downstream of the pumping element PUMP01. In order to obtain as accurate a value as possible of the temperature of the dielectric heat transfer fluid entering the battery 3 modules 7, the first temperature sensing element T01 must be located as close as possible upstream of the inlet of the battery 3 modules 7. It is also preferentially located downstream of pumping element PUMP01 to take account of possible heating of the dielectric heat transfer fluid by pumping element PUMP01. The first temperature sensing element T01 allows the control unit 11 to manage cooling device EXCH05 and heating device HEAT06 and/or to diagnose a malfunction of cooling device EXCH05 and heating device HEAT06 (with another temperature sensing element T03, T04 as explained below) and/or to diagnose the presence of flames external to the thermal regulation system 1.

Each battery 3 module 7 preferentially comprises at least a second temperature sensing element T02 (three in FIG. 3) closest to the electrical energy storage cells 9. Each second temperature sensing element T02 allows the control unit 11 to manage the operating mode of the thermal regulation system 1 (heating mode, free circulation mode or cooling mode) and/or to diagnose the presence of flames external to the thermal regulation system 1.

A third temperature sensing element T03 may be located as close as possible to the output of the battery 3 modules 7 so that the measurement is as representative as possible of the temperature of the dielectric heat transfer fluid at the output of the battery 3 modules 7. The third temperature sensing element T03 allows the control unit 11 to diagnose poor heat exchange between the electrical energy storage cells 9 and the dielectric heat transfer fluid (unexpected temperature variation) and/or to diagnose a malfunction of cooling device EXCH05 and heating device HEAT06 and/or to diagnose the presence of flames external to the thermal regulation system 1.

A fourth temperature sensing element T04 may be located between expansion vessel VES03 and valve VA04. The fourth temperature sensing element T04 allows the control unit 11 to diagnose a malfunction of cooling device EXCH05 and heating device HEAT06 and/or to diagnose the presence of flames external to the thermal regulation system 1.

The fluid network 6 is therefore constantly monitored to prevent malfunctioning of the components of the regulation system 1 such as a disturbance in the circulation of the dielectric heat transfer fluid, a heating and/or cooling deficit, or insufficient entrainment of the dielectric heat transfer fluid flow which could render the thermal regulation of the electrical energy storage cells 9 present in the battery 3 module 7 less effective. It is understood that the regulation system 1 therefore provides safer operation (maintenance of regulation quality) and greater reliability (maintenance of safe operating conditions for the regulation system 1—battery 3 assembly allowing a longer service life for the assembly). It can be concluded that thermal runaway of the battery 3 will be prevented by virtue of the thermal regulation system 1 which will limit the situations wherein irreversible damage to electrical energy storage cells 9 could occur.

Advantageously according to the invention, the thermal regulation system 1 may comprise at least a second temperature sensing element T02 inside the battery 3 module 7 electrically connected to the control unit 11 in order to selectively control the operating mode of the thermal regulation system 1 based on the value measured by the second temperature sensing element T02 and a predetermined target temperature of the battery 3 module 7. Each temperature measured in each battery 3 module 7 is preferentially monitored continuously and as soon as one of the temperatures drifts beyond predetermined thresholds above or below the predetermined target temperature, the control unit 11 activates cooling mode and heating mode respectively. If each of the temperature measurements remains within the range of predetermined thresholds above or below the predetermined target temperature, the control unit 11 activates the free circulation mode which simply drives the dielectric heat transfer fluid through the fluid network 6 without heating or cooling it. Of course, the predetermined target temperature and the predetermined thresholds may be different for each battery 3 module 7 depending on the configuration thereof and/or location in the motor vehicle 4. As a non-limiting example, the predetermined target temperature may be between 15° C. and 30° C., that is, equal to 15° C., 20° C., 25° C. or 30° C., and the predetermined thresholds between 10% and 30%, that is equal to 10%, 15%, 20%, 25% or 30%, of the predetermined target temperature.

Furthermore, according to the invention, the control unit 11 is preferentially configured to switch valve VA04 to the heating device HEAT06 by activating the latter when the value measured by the second temperature sensing element T02 is less than the predetermined target temperature of the battery 3 module 7 in order, in heating mode, to heat at least some of the electrical energy storage cells 9 included in the battery 3 module 7 up to the predetermined target temperature of the battery 3 module 7. Herein again, depending on predetermined thresholds above or below the predetermined target temperature (which are not necessarily equal), the control unit 11 activates or deactivates the heating mode.

Conversely, according to the invention, the control unit 11 is preferentially configured to switch valve VA04 to the cooling device EXCH05 by activating the latter when the value measured by the second temperature sensing element T02 is greater than the predetermined target temperature of the battery 3 module 7 in order, in cooling mode, to cool at least some of the electrical energy storage cells 9 included in the battery 3 module 7 to the predetermined target temperature of the battery 3 module 7. Herein again, depending on predetermined thresholds above or below the predetermined target temperature (which are not necessarily equal, nor necessarily identical to those of the heating mode), the control unit 11 activates or deactivates the cooling mode.

It is also understood that, advantageously according to the invention, the thermal regulation system 1 allows continuous adaptation to the external conditions wherein the motor vehicle 4 is moving, that is both the cold conditions (heating of cells 9) and the hot conditions (cooling of cells 9). It is also immediate that the control unit 11 can thus, initially, heat each battery 3 module 7 to arrive at the optimum operating temperature of the battery 3 such as, for example, thirty degrees Celsius and, secondly, thermally regulate (heat or cool) each battery module 7 to maintain the optimum operating temperature of the battery 3.

Furthermore, advantageously according to the invention, the control unit 11 selectively controls, in heating mode, the activation intensity of the heating device HEAT06 based on the value measured by the first temperature sensing element T01. It is therefore understood that the heating intensity applied to the dielectric heat transfer fluid is not controlled by the same temperature sensing element T01 as that T02 used to select the operating mode of thermal regulation system 1. This allows the intensity of the heating device HEAT06 to be controlled on the basis of a temperature measurement upstream of the battery 3 module 7.

Conversely, and advantageously according to the invention, in cooling mode, the control unit 11 selectively controls the activation intensity of the cooling device EXCH05 based on the value measured by the first temperature sensing element T01 (which may be the same as that used for heating mode). It is therefore herein also understood that the cooling intensity applied to the dielectric heat transfer fluid is not controlled by the same temperature sensing element T01 as that T02 used to select the operating mode of the thermal regulation system. This allows the intensity of the cooling device EXCH05 to be controlled on the basis of a temperature measurement upstream of the battery 3 module 7.

Thus, on the one hand, this allows the control unit 11 precise temperature control upstream of the battery 3 module 7, that is, before interaction with the electrical energy storage cells 9, and, on the other hand, as the battery 3 is preferentially designed to comprise several modules 7, it provides a homogeneous inlet temperature of the dielectric heat transfer fluid in each module 7.

Finally, in heating mode, the control unit 11 may, advantageously according to the invention, diagnose a failure of the heating device HEAT06 if the value measured by the fourth temperature sensing element T04 is not less than the value measured by the first temperature sensing element T01 (if the relationship T04≥T01 is verified). By means of simple instrumentation, the control unit 11 of the thermal regulation system 1 is immediately able to detect whether, effectively, the dielectric heat transfer fluid has actually been heated by the heating device HEAT06. It is also immediate that, if the value measured by the third temperature sensing element T03 is not less than the value measured by the first temperature sensing element T01 (if the relationship T03≥T01 is verified), that is, that a drop in temperature between the upstream and downstream of the battery 3 module 7 is not observed, the electrical energy storage cells 9 have not been warmed up.

Conversely, in cooling mode, the control unit 11 may, advantageously according to the invention, diagnose a failure of the cooling device EXCH05 if the value measured by the temperature sensing element T04 is not greater than the value measured by the first temperature sensing element T01 (if the relationship T04≤T01 is verified). By means of simple instrumentation, the control unit 11 of the thermal regulation system 1 is immediately able to detect whether, effectively, the dielectric heat transfer fluid has actually been cooled by the cooling device EXCH05. It is also immediate that, if the value measured by the third temperature sensing element T03 is not greater than the value measured by the first temperature sensing element T01 (if the relationship T03≤T01 is verified), that is, that a temperature rise between the upstream and downstream of the battery 3 module 7 is not observed, the electrical energy storage cells 9 have not been cooled.

According to the invention, the control unit 11 is preferentially configured to diagnose an obstruction of a battery 3 module 7 when the variations in values of the second temperature sensing elements T02 inside each battery 3 module 7 are different. In fact, as the battery 3 modules 7 are in parallel and supplied by the same dielectric heat transfer fluid at the same temperature, a variation in the temperature of one battery 3 module 7 beyond a predetermined threshold above the average temperature of the other battery 3 modules 7 can lead to the conclusion that a circulation fault is present in the battery 3 module 7 where the temperature variation changes more markedly than in the others. It is understood thus that diagnosis of the control unit 11 may be used to quickly check for any defective electrical energy storage cells 9 and where obstructions are by already knowing which battery 3 module 7 to check.

According to the invention, the control unit 11 is preferentially configured to vary the flow rate of the pumping element PUMP01 based on the electrical charging or discharging power of the battery 3 in order to adapt the circulation flow of the dielectric heat transfer fluid 6 in the fluid network based on the operation of the battery 3. It is therefore understood that the higher the battery 3 charging or discharging power, the higher the flow rate of the pumping element PUMP01, so the volume per unit time of dielectric heat transfer fluid passing through each battery 3 module 7 is higher to increase the thermal regulation capacity of the system 1. According to one example, the variation in flow rate of the pumping element PUMP01 could be proportional to the charging or discharging power of the battery 3.

Advantageously according to the invention, the control unit 11 can selectively control the pumping element PUMP01 based on the value measured by the flow sensing element F03. In fact, it may be useful to measure the effective flow rate after the pressure losses experienced in each battery 3 module 7, in order to, optionally, correct the control of the pumping element PUMP01 in order to obtain the thermal regulation power actually required depending on the volume per unit time of dielectric heat transfer fluid passing through each battery 3 module 7.

Advantageously according to the invention, the control unit 11 can diagnose, by comparing the value measured by the pressure sensing element P01 with the pressure estimated from the operating conditions of the pumping element PUMP01, a leak or on the contrary an obstruction in the fluid network. Herein again, if the fluid network 6 has no faults, this diagnosis would not be necessary. However, in the case of an on-board thermal regulation system 1 in a motor vehicle 4, it may be useful to measure the effective pressure between the pumping element PUMP01 and each battery 3 module 7 in order to determine, if the pressure is higher than a predetermined threshold than that theoretical for the current operation of the pumping element PUMP01, that the circulation of the dielectric heat transfer fluid is impeded in the fluid network 6 or, on the contrary, to determine, if the pressure is lower than a predetermined threshold than that theoretical of the current operation of the pumping element PUMP01, that part of the dielectric heat transfer fluid is escaping from the fluid network 6. It is thus understood that diagnosing the control unit 11 will allow the fluid network 6 to be quickly checked before electrical energy storage cells 9 become defective due to poor thermal regulation.

The control unit 11 of the regulation system is also configured to monitor the quality of the dielectric heat transfer fluid in order to ensure correct operation of the battery 3. Thus, the dielectric heat transfer fluid surrounding the electrical energy storage cells is constantly monitored to prevent pollution being introduced into the battery 3 module 7 through the circulation of the dielectric heat transfer fluid which could render thermal regulation less effective or lead to short circuits between the electrical energy storage cells 9 present in the battery 3 module 7. It is understood that the thermal regulation system 1 therefore allows safer operation (maintenance of regulation quality) and greater reliability (maintenance of safe operating conditions for the regulation system 1—battery assembly allowing a longer service life for the assembly). It can be concluded that thermal runaway of the battery 3 will be prevented by virtue of the thermal regulation system 1 which will limit the situations wherein irreversible damage to electrical energy storage cells could occur.

The thermal regulation system 1 may comprise at least one element Q04 for sensing at least one physical value of the dielectric heat transfer fluid mounted on the fluid network 6 and electrically connected to the control unit 11. Thus, it can capture both pollution induced by incorrect filling but also pollution in the thermal regulation system 1 itself (for example from electrical energy storage cells 9). If the quality sensing element Q04 was located only on the filling circuit, internal pollution would not be detectable. The control unit 11 can thus selectively control the operation of the thermal regulation system 1 based on the physical value of the dielectric heat transfer fluid measured by the sensing element Q04. This configuration allows it to continuously determine the presence or absence of pollution in the dielectric heat transfer fluid simply by monitoring one of the physical values thereof without having to intervene on the fluid network 6, that is, typically without having to take dielectric heat transfer fluid samples from the fluid network 6. It is also possible to immediately detect if the liquid used to fill the fluid network 6 is not the one expected. Preferentially, when pollution is determined, the processing unit 11 blocks the circulation of the dielectric heat transfer fluid in the fluid network 6 by stopping at least the pumping element PUMP014 to prevent any pollution from entering each battery 3 module 7 as soon as possible.

Preferentially, the sensing element Q04 is an electrical conductivity sensor (or, conversely, an electrical resistivity sensor) so that the control unit 11 selectively determines whether a risk of thermal deregulation (less efficient heat exchange) and/or a risk of short-circuit (possible electrical connection via the dielectric heat transfer fluid) is incurred in the battery 3 module 7 by the presence of the dielectric heat transfer fluid. Indeed, pollution is generally associated with a variation in electrical conductivity (electrical resistivity being the inverse of electrical conductivity) and this physical value has important consequences for the electrical connections in the battery 3 module 7 and, more generally, for the operation of the battery 3. As a non-limiting example, the sensing element Q04 may be an electrode sensor.

The quality threshold of the control unit 11, that is, the threshold above which the control unit 11 will consider that pollution is no longer negligible, may for example be an electrical conductivity $\sigma$ at most equal to $1 \text{ nS} \cdot \text{m}^{-1}$ or electrical resistivity $\rho$ at least equal to $1 \text{ G}\Omega \cdot \text{m}$ at a temperature of 300 K. Indeed, depending on the temperature of the dielectric heat transfer fluid, the electrical conductivity and, incidentally, the electrical resistivity, vary.

The sensing element Q04 is preferentially mounted on the fluid network 6 outside the battery 7 module 3, allowing the control unit 11 to stop the circulation of the dielectric heat transfer fluid before it reaches each battery 3 module 7 when a predetermined threshold, such as the above quality threshold, is exceeded by the measurement of the sensing element Q04. Typically, if a dielectric heat transfer fluid filling inlet to the fluid network 6 such as valve BV03 is present, the sensing element Q04 is preferentially installed downstream of and as close as possible to this filling inlet in order to maximize the speed of detection of a fluid filling error, that is, in particular if the liquid introduced into the fluid network 6 is not the expected dielectric heat transfer fluid and sufficiently upstream of each battery 3 module 7 so that the inertia of the thermal regulation system 1 does not cause the fluid to reach each battery 3 module 7 after the shutdown controlled by the control unit 11.

Finally, in the event of poor fluid quality being detected by the quality sensing element Q04, the control unit 11 shuts down the main components of the thermal control system 1 (pumping element PUMP01, cooling device EXCH05, heating device HEAT06, etc.). In addition, the control unit 11 can completely close valve VA03 or prevent poor-quality dielectric heat transfer fluid from reaching battery 3 module 7 (opening only between the upstream and downstream of the expansion vessel VES03). Additionally, the control unit 11 can close valve VA04 completely, that is, redirect the fluid in the cooling circuit. In the absence of pressure, this latter will be blocked by the shuttle valve SV01. The aim is also to prevent poor-quality fluid from reaching the battery 3 modules 7.

The invention is not limited to the embodiments and variants presented and other embodiments and variants will become clearly apparent to the person skilled in the art. Thus, the embodiments and variants can be combined with one another without departing from the scope of the invention. By no means restrictively, another type of sensing element T01, T02, T3, T04, F03, P01 is possible without going beyond the scope of the invention.

LIST OF REFERENCES

1—thermal regulation system
2—powertrain
3—battery
4—motor vehicle
5—electrical connection element
6—fluid network
7—battery module
8—battery module housing
8a—upper housing cover
8b—lower recessed base of the housing
9—electrical energy storage cells
10—common inlet manifold
10a—side input
10b—central input
11—control unit
11a—processing module
11b—receiving module
12—common output manifold
T01—temperature sensing element
T02—temperature sensing element of a module
T03—temperature sensing element
T04—temperature sensing element
C02—pollution sensing element of a module
F03—dielectric heat transfer fluid flow sensing element
Q04—element for sensing a physical value of the dielectric heat transfer fluid
P01—pressure sensing element
L04—level sensing element in the expansion vessel
BV01—controllable valve
BV03—controllable valve
BV04—controllable valve
VA03—controllable proportional valve
VA04—controllable proportional valve
SV01—shuttle valve
VES04—expansion vessel
OPR03—pressure relief valve
FILT01—filter element
FILT02—filter element
PUMP01—pumping element
EXCH05—cooling device
HEAT06—heating device

The invention claimed is:

1. A thermal regulation system for a battery of a motor vehicle comprising a closed fluid network, wherein a flow of a dielectric heat transfer fluid in liquid phase is formed by means of a pumping element, the fluid network comprising a battery module able to receive electrical energy storage cells to be thermally regulated by at least partial filling of the battery module with the dielectric heat transfer fluid, wherein the thermal regulation system comprises:
control circuitry configured to monitor an effectiveness of thermal regulation in order to guarantee correct operation of the battery;
a first temperature sensing element inside the battery module electrically connected to the control circuitry in order to selectively control an operating mode of the thermal regulation system based on a value measured by the first temperature sensing element and a predetermined target temperature of the battery module;
a device configured to heat the dielectric heat transfer fluid mounted in the fluid network upstream of the pumping element, the control circuitry being configured to activate the heating device when the value measured by the first temperature sensing element is less than the predetermined target temperature of the battery module in order, in a heating mode, to heat at least some of the electrical energy storage cells included in the battery module up to the predetermined target temperature of the battery module;
a second temperature sensing element mounted on the fluid network at a location downstream of the pumping element and upstream of the battery module and electrically connected to the control circuitry in order, in the heating mode, to selectively control an activation intensity of the heating device based on a value measured by the second temperature sensing element mounted on the fluid network at the location downstream of the pumping element and upstream of the battery module; and
a third temperature sensing element mounted on the fluid network at a location downstream of the battery module and upstream of the heating device and electrically connected to the control circuitry in order, in the heating mode, to diagnose a failure of the heating device if a value measured by the third temperature sensing element at the location downstream of the battery module and upstream of the heating device is not less than the value measured by the second temperature sensing element mounted at the location downstream of the pumping element and the upstream of the battery module.

2. The thermal regulation system according to claim 1, wherein the fluid network comprises a plurality of battery modules connected in parallel, the control circuitry being further configured to diagnose an obstruction of a battery module, of the plurality of battery modules, when variations in values of each corresponding temperature sensing element inside each battery module are different.

3. The thermal regulation system according to claim 1, wherein the control circuitry is further configured to vary a flow rate of the pumping element based on an electrical charging or discharging power of the battery in order to adapt a circulation flow of the dielectric heat transfer fluid in the fluid network based on an operation of the battery.

4. The thermal regulation system according to claim 1, further comprising a flow rate sensing element located downstream of the battery module electrically connected to the control circuitry in order to selectively control the pumping element based on a value measured by the flow rate sensing element.

5. The thermal regulation system according to claim 1, further comprising an element configured to sense a pressure at a location downstream of the pumping element and upstream of the battery module and electrically connected to the control circuitry in order to diagnose, by comparing a value measured by the pressure sensing element with a pressure estimated from operating conditions of the pumping element, a leak, or an obstruction in the fluid network.

6. The thermal regulation system of claim 1, wherein the pumping element pumps the dielectric heat transfer fluid, which is a single-phase dielectric heat transfer fluid.

7. A thermal regulation system for a battery for a motor vehicle comprising a closed fluid network, wherein a flow of a dielectric heat transfer fluid in liquid phase is formed by means of a pumping element, the fluid network comprising a battery module able to receive electrical energy storage cells to be thermally regulated by at least partial filling of the battery module with the dielectric heat transfer fluid, wherein the thermal regulation system comprises:

control circuitry configured to monitor an effectiveness of thermal regulation in order to guarantee correct operation of the battery;

a first temperature sensing element inside the battery module electrically connected to the control circuitry in order to selectively control an operating mode of the thermal regulation system based on a value measured by the first temperature sensing element and a predetermined target temperature of the battery module;

a device configured to cool the dielectric heat transfer fluid mounted in the fluid network upstream of the pumping element, the control circuitry being configured to activate the cooling device when the value measured by the first temperature sensing element is greater than the predetermined target temperature of the battery module in order, in a cooling mode, to cool at least some of the electrical energy storage cells in the battery module to the predetermined target temperature of the battery module;

a second temperature sensing element mounted on the fluid network at a location downstream of the pumping element and upstream of the battery module, and electrically connected to the control circuitry in order to, in the cooling mode, selectively control an activation intensity of the cooling device based on a value measured by the second temperature sensing element mounted on the fluid network at the location downstream of the pumping element and upstream of the battery module; and a third temperature sensing element mounted on the fluid network at a location downstream of the battery module and upstream of the cooling device and electrically connected to the control circuitry in order, in the cooling mode, to diagnose a failure of the cooling device if a value measured by the third temperature sensing element at the location downstream of the battery module and upstream of the cooling device is not greater than the value measured by the second temperature sensing element mounted at the location downstream of the pumping element and upstream of the battery module.

8. The thermal regulation system according to claim 7, wherein the fluid network comprises a plurality of battery modules connected in parallel, the control circuitry being further configured to diagnose an obstruction of a battery module when variations in values of each corresponding temperature sensing element inside each battery module are different.

9. The thermal regulation system according to claim 7, wherein the control circuitry is further configured to vary a flow rate of the pumping element based on an electrical charging or discharging power of the battery in order to adapt a circulation flow of the dielectric heat transfer fluid in the fluid network based on an operation of the battery.

10. The thermal regulation system according to claim 7, further comprising a flow rate sensing element located downstream of the battery module electrically connected to the control circuitry in order to selectively control the pumping element based on a value measured by the flow rate sensing element.

11. The thermal regulation system according to claim 7, further comprising an element configured to sense a pressure at a location downstream of the pumping element and upstream of the battery module and electrically connected to the control circuitry in order to diagnose, by comparing a value measured by the pressure sensing element with a pressure estimated from operating conditions of the pumping element, a leak, or an obstruction in the fluid network.

12. The thermal regulation system of claim 7, wherein the pumping element pumps the dielectric heat transfer fluid, which is a single-phase dielectric heat transfer fluid.

13. A motor vehicle comprising the thermal regulation system according to claim 1, wherein each battery module of the motor vehicle comprises the electrical energy storage cells.

14. A motor vehicle comprising the thermal regulation system according to claim 7, wherein each battery module of the motor vehicle comprises the electrical energy storage cells.

* * * * *